March 11, 1952 J. W. MARSH 2,588,549
THROTTLE VALVE APPLICATION
Filed Oct. 19, 1945 5 Sheets-Sheet 1

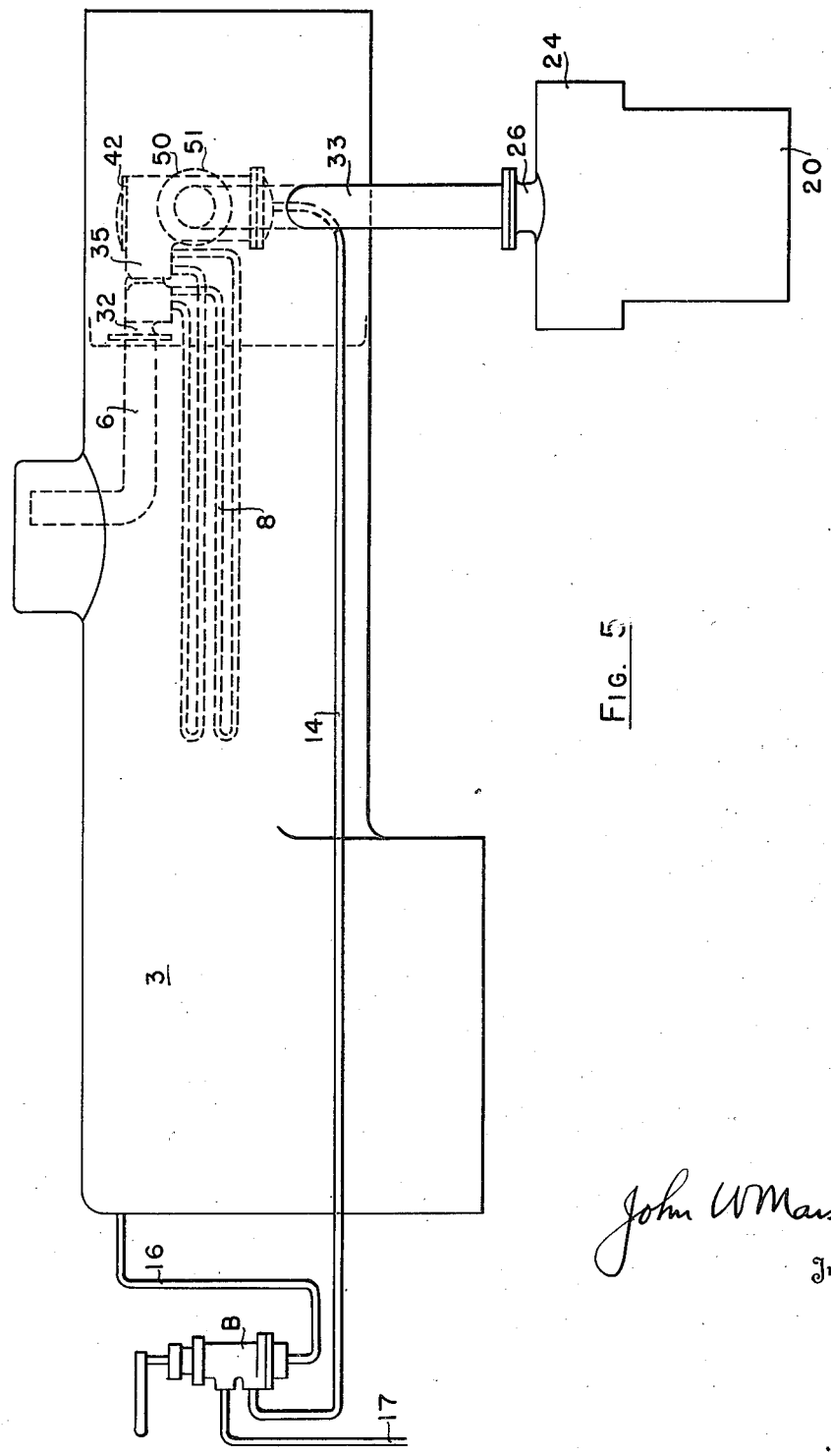

March 11, 1952 — J. W. MARSH — 2,588,549
THROTTLE VALVE APPLICATION
Filed Oct. 19, 1945 — 5 Sheets-Sheet 5

John W Marsh
Inventor

Patented Mar. 11, 1952

2,588,549

UNITED STATES PATENT OFFICE 2,588,549

THROTTLE VALVE APPLICATION

John W. Marsh, Alexandria, Va.

Application October 19, 1945, Serial No. 623,260

4 Claims. (Cl. 121—143)

This invention relates to improvements in throttle valve application and more particularly to the control of fluid pressure operated devices such as the steam cylinders of a locomotive or locomotives.

It is among the objects of this invention to provide for controlling a throttle valve operated by fluid pressure tight means operatively controlled from a remote point.

A further object of this invention is to provide for controlling fluid pressure supplied to a fluid pressure utilizing means without employing mechanical means interposed between the control point and the pressure utilizing means, and without an external operating cylinder and stuffing box.

Another object of this invention is to provide for a multiple unit control, of a plurality of fluid pressure operated devices, such as steam locomotives coupled together.

A further object of this invention is to combine with the conduit system between a source of fluid pressure and a fluid pressure operated means, a fluid pressure control valve operatively controlled from a remote point.

These and other objects and advantages of this invention will become apparent upon consideration of the following detailed description when taken in conjunction with the accompanying drawings, in which like characters designate like parts, and in which Figure 1 is a partial sectional view of a fluid pressure actuated throttle valve which is more completely described and claimed in my co-pending application, Serial No. 564,374, now forfeited.

Figure 5 is a diagrammatic view illustrating an application of the throttle valve of the present invention to a superheater header.

Figure 1:
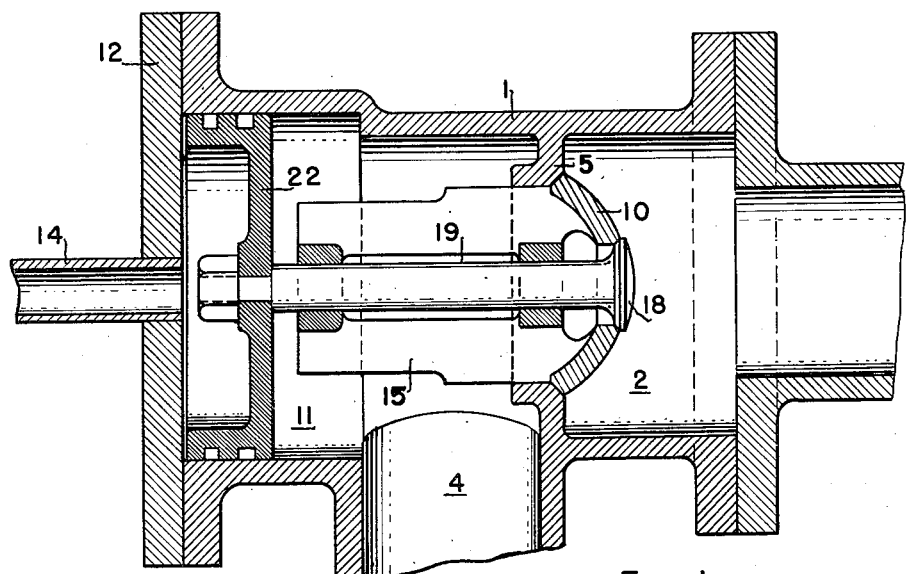

Referring at first more particularly to Figure 3 of the drawings which illustrates an application of the present invention, it will be explained that 3 designates a source of fluid pressure such as the boiler of a locomotive. At 8 there has been illustrated conventionally a superheater to which is connected a superheater header 7 provided with a drypipe 6 leading to a main stop valve 13. These parts are all conventional and do not constitute a part of the present invention. The reference character A designates the throttle valve of the present invention which has its inlet connected to a steam pipe 9 leading from the super heater header 7 or from any portion of the source of fluid under pressure. The throttle has an outlet 26 which is connected to any common or preferred form of steam chest 24 associated with an engine cylinder 20 as is the common practice. The valve member of the throttle A is subject at one side thereof to the fluid pressure conducted thereto by the pipe 9 from the source of pressure and is thereby held closed. Provision is made for opening the valve of the throttle by means of fluid pressure applied to said valve in opposition to the operating pressure admitted to the throttle, as by means of a conduit 14 leading from a hand-actuated throttle control device B which is in communication with a suitable source of fluid pressure, such as the boiler 3 of the locomotive, by means of the pipe 16. A vent pipe 17 is provided for the device B. From the foregoing it will be understood that the throttle is held closed by the fluid pressure entering the throttle from the source of pressure, and that the throttle may be opened by manipulation of the throttle control device B which is utilized for the purpose of controlling pressure through pipe 14 to the throttle in opposition to the operating pressure supplied thereto through the pipe 9. By selectively actuating the device B, fluid pressure from the pipe 9 to the throttle A may be controlled at will for throttling the supply of pressure through the pipe 9 to the steam chest 24, and for completely shutting off the supply thereto.

Referring to Figure 1, it will be seen that there is provided a housing 1, having an inlet 2 and an outlet 4, each of which communicates with chamber 11 in housing 1. Chamber 11 is closed by cover 12, provided with a control conduit 14. Inlet 2 and outlet 4 are separated by web 5 on which is seated main valve 10. Auxiliary valve 18 is seated on main valve 10 and is provided with stem 19, secured to piston 22, slideably mounted in cylinder 11. Main valve 10 is provided with vanes 15 which guide valve 10 through web 5 and extend toward piston 22. The structure thus described constitutes the pressure actuated throttle valve of the present invention.

Fluid pressure in inlet chamber 2 holds valves 10, 18 on their respective seats until sufficient fluid pressure is applied through conduit 14 on piston 22 working in chamber 11 as a piston cylinder to overcome the fluid pressure on the exposed surfaces of valves 10, 18, whereupon the smaller auxiliary valve 18 opens, permitting piston 22 to move into contact with vanes 15 and open main valve 10. The fluid pressure established in outlet 4 acts on piston 22 to oppose fluid pressure operatively applied on piston 22 through conduit 14. The opening and closing of valves 10, 18 is effected by the difference in fluid pressure acting on the opposite sides of piston 22, whereby any fluid pressure may be maintained in outlet 4 by operatively maintaining a corresponding fluid pressure on piston 22 through conduit 14, all as more fully illustrated and described in my co-pending application Serial No. 564,374.

Figure 2:
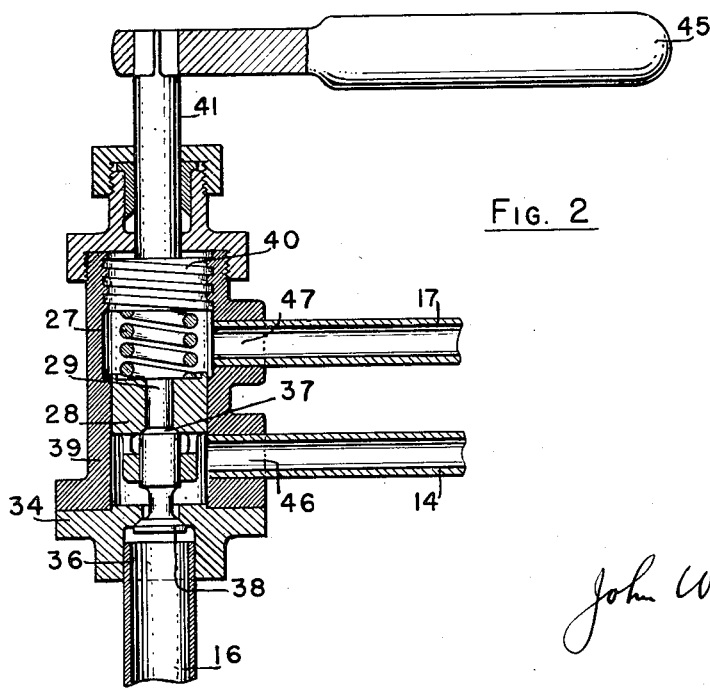
Figure 2 is a partial sectional view of a hand control device, suitable for operatively controlling the throttle valve shown in Figure 1 from a remote point.

A hand actuated throttle control device for applying and maintaining fluid pressure on piston 22 through conduit 14 is shown in Figure 2, in which 39 is a housing having piston 28 slideably disposed therein. The upper end of housing 39 is threaded and engages member 40, which may be rotated by stem 41 and handle 45. Spring 27 is interposed between threaded member 40 and piston 28. Piston 28 has a central opening 29 closed by valve 37. Housing 39 is provided with cover 34, having inlet 36 communicating with a source of fluid pressure through conduit 16. Housing 39 is also provided with an outlet 46, communicating through conduit 14 with the throttle valve heretofore described, and with exhaust port 47, communicating with opening 29 and exhausting to the atmosphere through conduit 17. Valve 37 is also provided with a second seat 38 which controls communication between inlet 36 and outlet 46.

Rotation of threaded member 40 compresses spring 27 against piston 28, closing valve 37 and opening seat 38 to admit fluid under pressure to outlet 46 and conduit 14. When fluid pressure in outlet 46 acting under piston 28, is sufficient to raise piston 28 against the compression of spring 27, seat 38 closes. Any reduction of fluid pressure in conduit 14 reduces fluid pressure under piston 28 which under the influence of spring 27, moves downward to open seat 38 and reestablish the desired fluid pressure in conduit 14. Any fluid pressure in conduit 14 in excess of that desired and controlled by positioning threaded member 40, acts also under piston 28 to raise piston 28 against the pressure of spring 27 and withdraw piston 28 from valve 37, thus discharging fluid from conduit 14 through opening 29 to exhaust port 47 and exhaust conduit 17. The construction and operation of this control valve is more completely described in my co-pending application, Serial No. 564,374, and is related to the valve described and claimed in my co-pending application Serial No. 596,637, filed May 30, 1945, now Patent No. 2,450,480, dated October 5, 1948.

Figure 3:
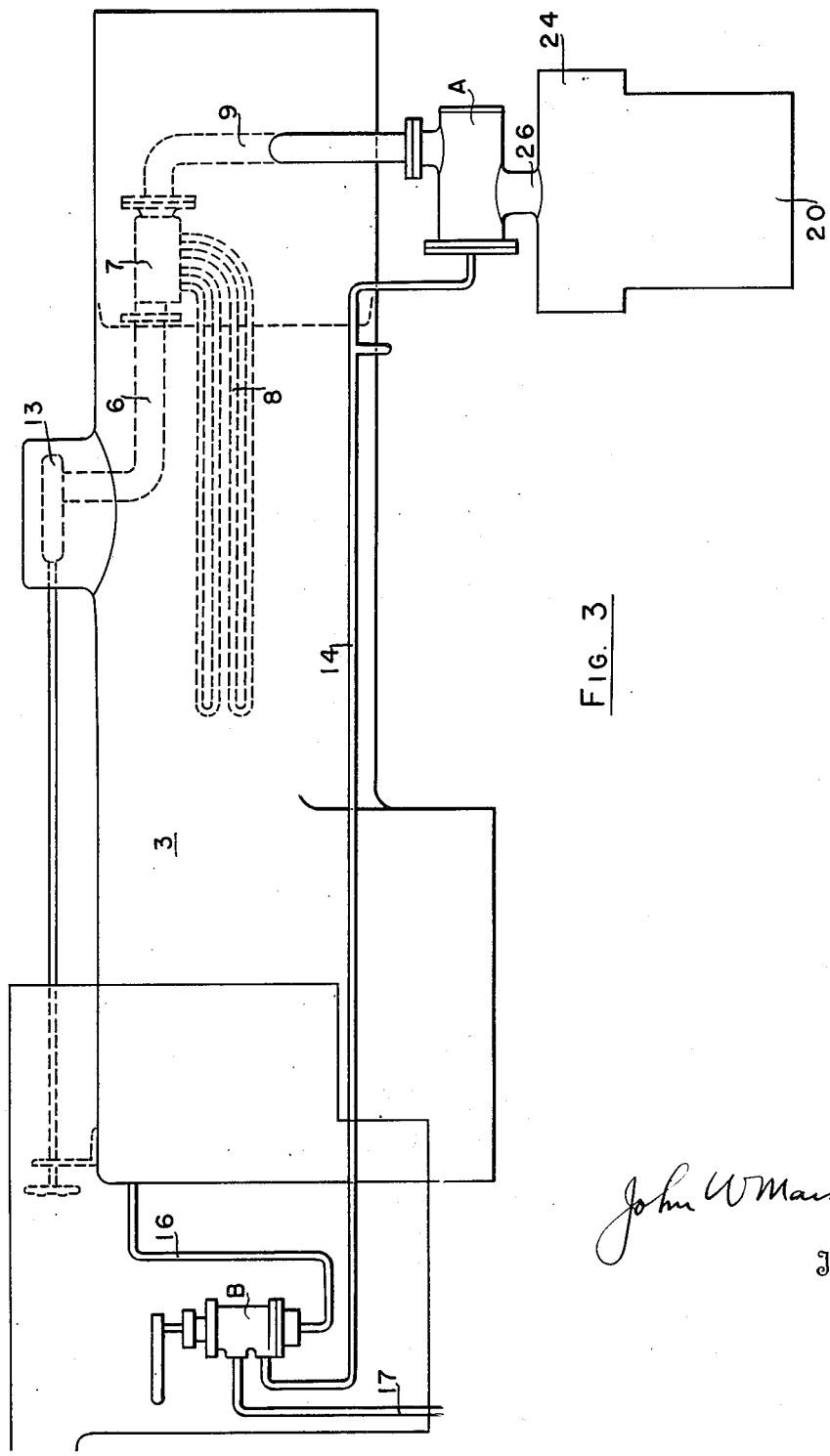
Figure 3 is a diagrammatic view illustrating the application of the throttle valve on a locomotive cylinder.

A typical application of this invention is shown in Figure 3, in which 3 designates a locomotive boiler, provided with drypipe 6, superheater header 7, superheater 8, and branch pipes 9. The throttle structure A, shown in Figure 1 is mounted on each steam chest 24, communicating with the steam space of the boiler through a branch pipe, superheater header, superheater and drypipe aforesaid. A main stop valve 13, which forms no part of the present invention, may be provided and operated from the cab of the locomotive, so that maintenance or repair operations may be performed without blowing off boiler pressure. The throttle structure A also communicates, through conduit 14, with a hand actuated throttle control device B, such as shown in Figure 2, mounted in the locomotive cab in a position convenient for manual operation. Conduit 16 provides communication between the inlet of control device B and the steam space of the boiler. Conduit 17 exhausts steam from the control valve B to a point outside the cab.

Figure 4:
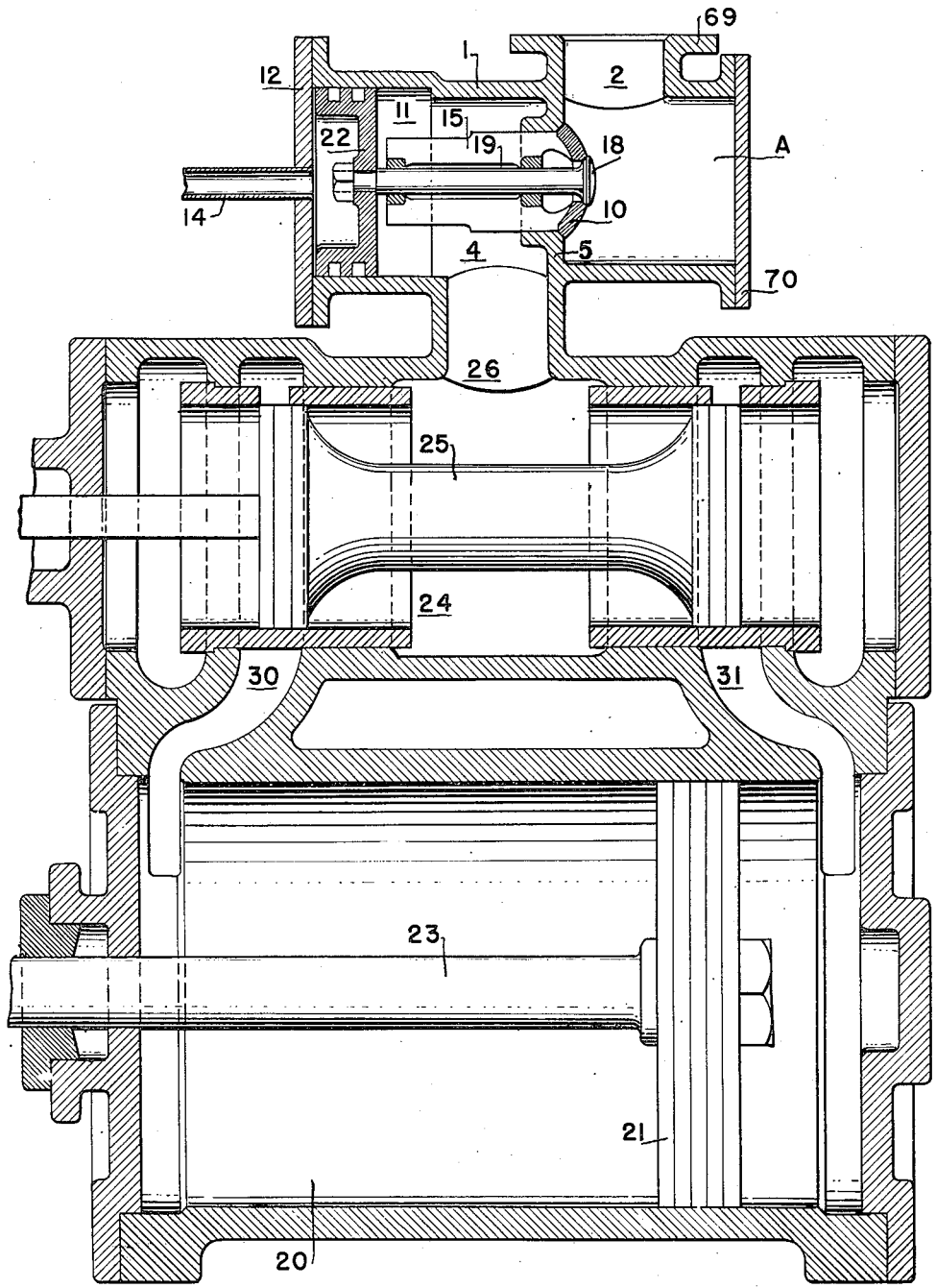
Figure 4 is a sectional view of a locomotive cylinder with the remotely controlled throttle valve of the present invention mounted thereon.

A more detailed view of the application of the throttle valve to the steam chest of a locomotive cylinder is shown in Figure 4, in which 20 is a locomotive cylinder having a piston 21 slideably disposed therein and secured to piston rod 23, by which connection is made to conventional driving mechanism. A steam chest 24 is attached to cylinder 20 and has a valving member 25 slideably disposed therein for establishing communication between inlet 26 and alternate ends of cylinder 20 through ports 30, 31. The throttle structure A, generally as shown in Figure 1, is mounted on steam chest 24. In this particular application, inlet 2 is provided with a flanged opening 69 adapted to be secured to branch pipe 9 (Fig. 3), leading from superheater header of locomotive and with cover 70, secured to housing 1, for access to valve 10. As applied to a steam locomotive, a throttle valve of the type described may be applied to the steam chest of each cylinder, and both throttle valves simultaneously controlled from the locomotive cab by the throttle control device B of the present invention without the intervention of any mechanical devices. Conduit 14 may provide communication between a throttle control device B and a plurality of throttle structures A, and thus all such throttle structures may be simultaneously controlled by the single device B.

Another typical application of this invention is shown in Figure 5, in which 3 designates a locomotive boiler, provided with a drypipe 6, superheater header 32, superheater 8, and branch pipes 33 communicating with cylinder steam chests 24. The throttle structure, which may be a single valve as shown in Figure 1, or a multiple valve as shown in Figure 6, may be mounted on the superheater header 32 and controlled by pressure admitted to the throttle through conduit 14, under control by the throttle control device B, which may be as shown in Figure 2 and mounted in the locomotive cab as aforesaid.

In the application of the throttle structure shown in Figure 1 to superheater header 32, housing 1 is attached to header 32, inlet 2 communicating with header outlet 35, and closed by cover 42 attached to housing 1. Outlet 4 is bifurcated and secured to branch pipes 33, communicating with cylinder steam chests 24.

Figures 6, 7:
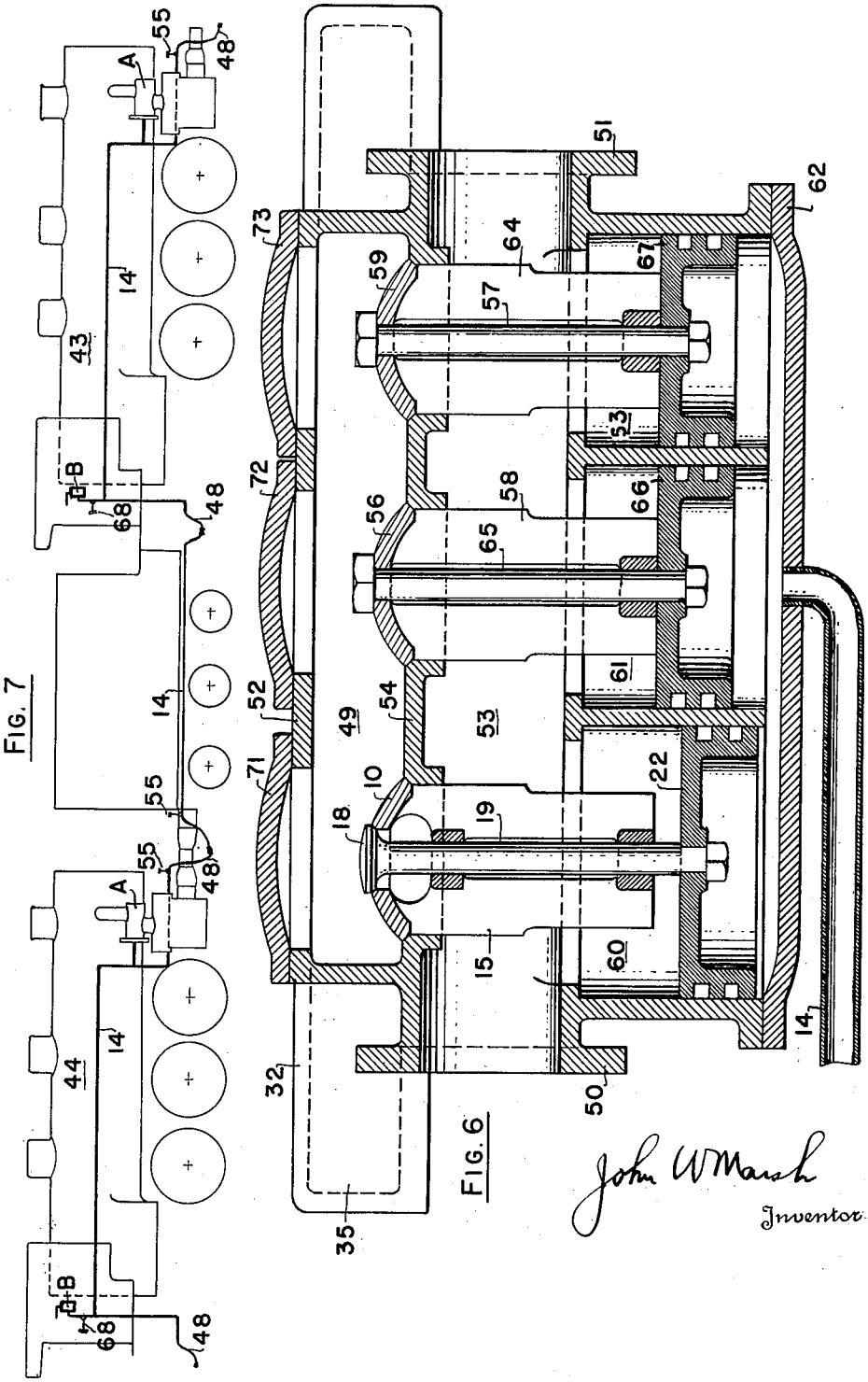
Figure 6 is a sectional view illustrating a plurality of throttle valves of the present invention connected in series.
Figure 7 is a diagrammatic view showing a plurality of steam locomotives having the pressure at each operating cylinder controlled from the cab of one locomotive in accordance with the present invention.

The application of a multiple throttle valve structure to the superheater header is shown in detail in Figure 6, in which throttle inlet chamber 49 communicates with superheater header outlet 35, and is closed by covers 71, 72, 73, secured to housing 52. Housing 52 is provided with outlet chamber 53 having flanged outlets 50, 51 adapted to be secured respectively to branch pipes 33 (Fig. 5) to admit pressure to the steam chest 24. Inlet chamber 49 is separated from outlet chamber 53 by web 54 on which are seated valves 10, 56, 59. Communicating with outlet chamber 53 are cylinders 60, 61, 63, having pistons 22, 66, 67, respectively, slideably disposed therein. Cylinders 60, 61, 63 are provided with closure 62, and communicate with a throttle control device B such, as shown in Figure 2, through conduit 14. Auxiliary valve 18 is seated on valve 10 and is provided with stem 19, secured to piston 22. Valve 10 is provided with vanes 15 which extend toward piston 22. Valves 56, 59 are provided with vanes 58, 64 respectively, which extend to pistons 66, 67, and valves 56, 59 are secured respectively to pistons 66, 67 by bolts 65, 57.

Fluid pressure in inlet chamber 49 holds valves 10, 18, 56, 59 on their respective seats until sufficient fluid pressure is applied through conduit 14 and under pistons 22, 66, 67 to overcome the fluid pressure on the exposed surfaces of valves 10, 18, 56, 59. Since the ratio between the area of piston 22 and valve 18 is substantially greater than the ratios between the areas of the other pistons and their respective valves, valve 18 opens first, permitting piston 22 to move into contact with vanes 15 and open valve 10. The area of piston 66 is smaller relative to the area of valve 56 than is the area of piston 22 relative to the area of valve 10, hence a controlled fluid pressure applied under piston 22 will overcome source fluid pressure on valve 10 and open valve 10 fully before the same controlled fluid pressure applied under piston 66 will overcome the source fluid pressure acting on valve 56 and open valve 56. Similarly the area of piston 67 is smaller relative to the area of valve 59 than is the area of piston 66 relative to the area of valve 56, and a controlled fluid pressure applied under piston 66 will overcome source fluid pressure acting on valve 56 and open valve 56 fully before the same controlled fluid pressure applied under piston 67 will overcome source fluid pressure acting on valve 59 and open valve 59. Valves 10, 56 and 59 open successively to progressively admit pressure from inlet header 49 into outlet chamber 53.

The fluid pressure in outlet chamber 53 acts also on top of pistons 22, 66, 67 to oppose fluid pressure controllably applied under pistons 22, 66, 67, through conduit 14. The opening and closing of valves 10, 18, 56, 59 is effected by the difference in fluid pressure acting on opposite sides of pistons 22, 66, 67, whereby any fluid pressure may be maintained in outlet chamber 53 by maintaining a controlled corresponding fluid pressure below pistons 22, 66, 67 through conduit 14, by means of throttle control device B all as more fully described in my co-pending application Serial No. 564,374.

With reference to Figure 7, 43 indicates a first locomotive and 44 indicates a second locomotive coupled thereto, each locomotive being provided with throttle valves A, of the type shown and described herein, and in my co-pending application, Serial No. 564,374, and at least one locomotive provided with a throttle control device B, which may be of the type shown in Figure 2 and described herein. Conduit 14 extends over the length of each locomotive and is provided with flexible couplings 48 between the locomotives, and with cocks 55 to close the ends of the conduit 14 when the locomotives are uncoupled. Cutoff cock 68 is provided in control conduit 14, adjacent to throttle control device B, which may be closed to prevent loss of control fluid at a non-operative throttle device B, as on a second locomotive 44, when control is effected from the first locomotive 43.

It will be apparent that fluid pressure maintained in conduit 14 by device B will control the fluid pressure in the steam chests of all locomotives simultaneously, and that all locomotives will be operatively controlled thereby as a unit. The opening of cutoff cock 68 on any following locomotive as 44 will permit control fluid pressure in conduit 14 to be exhausted and shut off the supply of steam to all steam chests. Also the failure by leakage in conduit 14, or in flexible couplings 48, will shut off supply of steam to all steam chests.

It will be further apparent that this invention provides means to operatively maintain desired fluid pressure at a plurality of fluid pressure utilizing means simultaneously from a remote point, such control being effected without mechanical means, such as throttle levers, rods, bell cranks and stuffing boxes, and while particularly applicable to steam locomotive or locomotives, is not restricted to such use, but is equally applicable to the control of fluid pressure where such control is desired at a single, or plurality of utilizing means.

It will be still further apparent that the arrangements shown may be modified to place the throttle at any point between the source and the utilizing means, or to combine the throttle with any element in the fluid conduit system, such as boiler drypipe or point of bifurcation.

The structures and arrangements shown and described are all typical of a principle of fluid pressure control embodied in this invention, and other structures, arrangements and applications within the spirit of this invention will suggest themselves to one skilled in the art. The embodiments shown and the embodiments claimed are, therefore, to be considered in all respects as illustrative and not restrictive, and all changes that come within the means and range or equivalency of the embodiments shown and the embodiments claimed are, therefore, intended to be embraced therein.

Having described my invention, what I claim as new and wish to secure by Letters Patent is:

1. In combination, an operating cylinder adapted to produce power by application of fluid pressure, a distributing valve chamber mounted on said cylinder and containing means to distribute fluid under pressure to alternate ends of said cylinder, a throttle valve mounted on said distributing valve chamber, a source of fluid under pressure communicating with said throttle valve and holding said valve closed, said throttle valve being actuated by fluid tight means wherein fluid pressure in said distributing valve chamber opposes fluid pressure controlled from a remote point.

2. In combination with a steam locomotive cylinder, a steam chest thereon adapted to enclose means to distribute steam to alternate ends of said cylinder, and ports adapted to convey steam from said steam chest to said cylinder, throttle means mounted on said steam chest to control fluid pressure within said steam chest, said throttle means being actuated by fluid pressure controlled from a remote point.

3. In combination with a steam locomotive cylinder, a steam chest mounted on said cylinder and adapted to enclose means to distribute steam to alternate ends of said cylinder, and ports adapted to convey steam from said steam chest to said cylinder, throttle means mounted on said steam chest to control fluid pressure within said steam chest, said throttle means being actuated by fluid pressure within said steam chest opposing fluid pressure controlled from a remote point.

4. A locomotive cylinder casting comprising a cylinder, a steam chest thereon, and a housing upon and communicating with said steam chest, said housing having an inlet, an outlet communicating with said steam chest, a web between said inlet and said outlet provided with a valve seat, a valve element for said seat controlling flow of fluid under pressure from said inlet to said steam chest through the outlet of the housing, a chamber communicating with said outlet and a fluid tight means mounted in the chamber for the purpose of actuating said valve element.

JOHN W. MARSH.

REFERENCES CITED

The following references are of record in the file of this patent:

UNITED STATES PATENTS

| Number | Name | Date |
| --- | --- | --- |
| 432,111 | Baker | July 15, 1890 |
| 535,861 | Sargent | Mar. 19, 1895 |
| 941,426 | Loudon | Nov. 30, 1909 |
| 1,057,941 | Crawford | Apr. 1, 1913 |
| 1,087,399 | Phelps | Feb. 17, 1914 |
| 1,717,599 | Armstrong | June 18, 1929 |
| 1,789,691 | Roberts | Jan. 20, 1931 |
| 1,839,915 | Chorlton | Jan. 5, 1932 |
| 1,839,921 | Herr | Jan. 5, 1932 |
| 1,929,643 | Landenberger | Oct. 10, 1933 |
| 2,078,262 | McGrew | Apr. 27, 1937 |
| 2,259,809 | Freeman | Oct. 21, 1941 |
| 2,313,564 | Manly | Mar. 9, 1943 |
| 2,383,277 | Stevens | Aug. 21, 1945 |

FOREIGN PATENTS

| Number | Country | Date |
| --- | --- | --- |
| 356,846 | Great Britain | Sept. 17, 1931 |